United States Patent [19]

Lee

[11] Patent Number: 5,613,266
[45] Date of Patent: Mar. 25, 1997

[54] WINTER WINDSHIELD WIPER HAVING A CONTOURED AND FLEXIBLE VANE

[76] Inventor: Albert Lee, 232 Margate Rd., Timonium, Md. 21093

[21] Appl. No.: 552,929

[22] Filed: Nov. 3, 1995

[51] Int. Cl.$^6$ ................................. B60S 1/38; B60S 1/40
[52] U.S. Cl. ................................. 15/250.201; 15/250.46; 15/250.32; 15/250.44
[58] Field of Search .................... 15/250.201, 250.46, 15/250.32, 250.44, 250.43, 250.451, 250.452, 250.453, 250.48

[56] References Cited

U.S. PATENT DOCUMENTS

| 4,342,126 | 8/1982 | Neefeldt | 15/250.44 |
|---|---|---|---|
| 4,360,941 | 11/1982 | Mabie | 15/250.44 |
| 5,311,636 | 5/1994 | Lee | 15/250.201 |

FOREIGN PATENT DOCUMENTS

| 966609 | 4/1975 | Canada | 15/250.44 |
|---|---|---|---|
| 148627 | 12/1974 | Japan | 15/250.201 |
| 2630069 | 10/1989 | Japan | 15/250.201 |
| 2144976 | 3/1985 | United Kingdom | 15/250.44 |

*Primary Examiner*—Gary K. Graham
*Attorney, Agent, or Firm*—Birch, Stewart, Kolasch & Birch, LLP

[57] ABSTRACT

A winter windshield wiper for use in a motor vehicle includes a connecting member, a rubber sheet sealed windshield wiper frame having a wiper blade, disposed under the connecting member, and a horizontally elongated vane member having at least one wing for effectively cleaning and wiping the convex surface of the windshield glass, and extending the operation life of the windshield wiper.

10 Claims, 1 Drawing Sheet

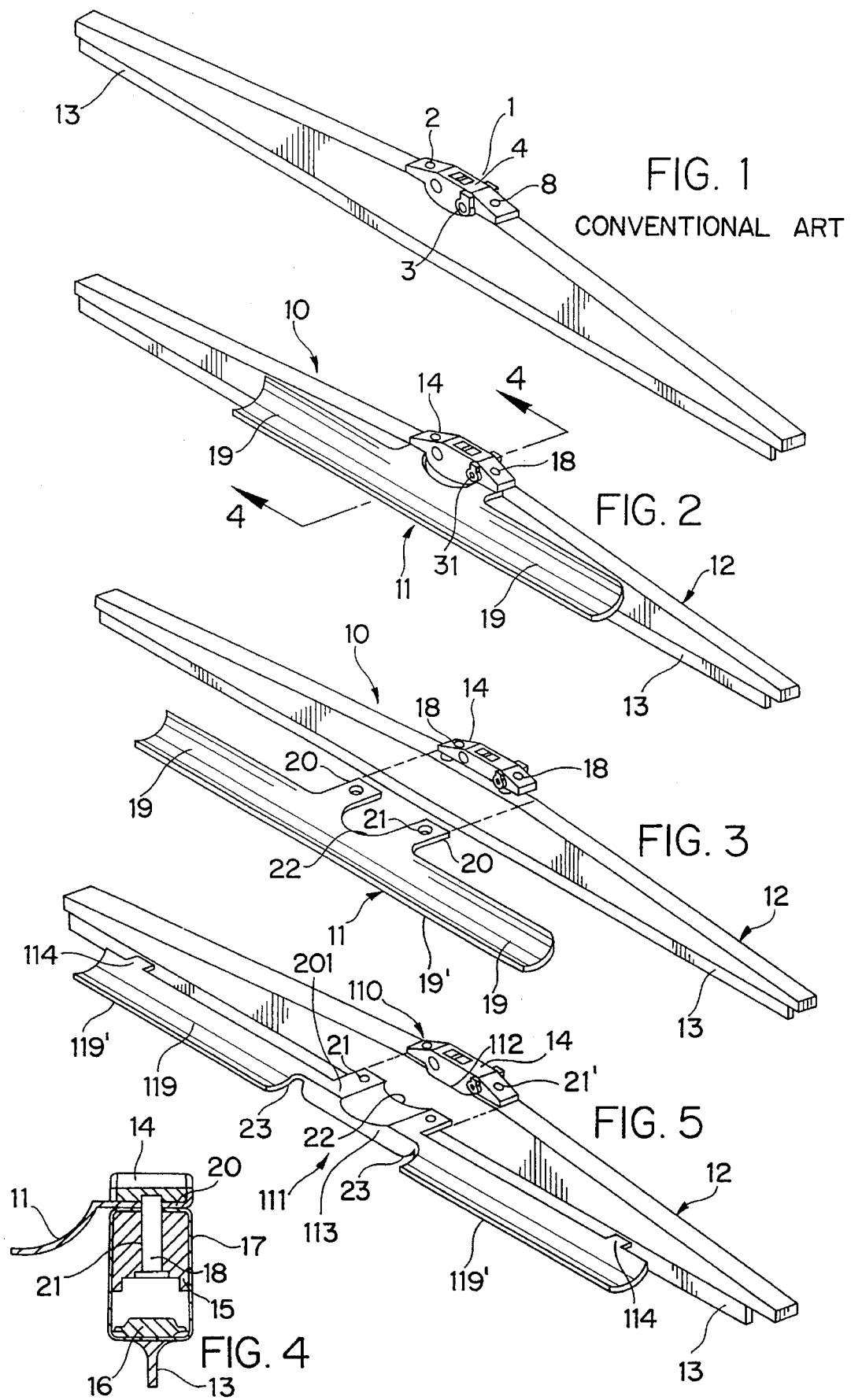

WINTER WINDSHIELD WIPER HAVING A CONTOURED AND FLEXIBLE VANE

BACKGROUND OF THE INVENTION

1. Field of the Invention

The present invention relates to the construction of a winter windshield wiper for a motor vehicle and more particularly, to an improved winter windshield wiper having at least one horizontally elongated, contoured and flexible vane for effectively cleaning and wiping the convex surface of the windshield glass of a motor vehicle in a cold climate or the winter time, and extending the operation life of the windshield wiper.

2. Description of the Related Art

Generally, various types of windshield wiper frames for a windshield wiper assembly are well known. Such windshield wiper frames include a bridge, a pair of primary yokes pivotally connected to the bridge, a pair of secondary yokes pivotally connected to one end of each primary yoke, a mounting stay mounted on the other end of each primary yoke and mounting stays mounted on each end of the secondary yokes. However, such conventional art wiper frames suffer from poor cleaning performance by the windshield wiper blade due to inadequate pressure on the windshield glass.

In order to improve cleaning performance, one known windshield wiper frame as shown in FIG. 1, is equipped with a bridge having a pair of vanes extending up from the rear walls thereof. However, this wiper frame suffers from a number of problems. For example, as air flowing past the vehicle presses down on the pair of vanes, the entire upper portion of the wiper frame is also pressed down toward the glass, causing the entire frame to pivot slightly. Therefore, the lower portion of the wiper frame, and the wiper blade itself may be lifted slightly away from the glass, thereby preventing the wiper blade from effectively cleaning the convex surface of the windshield glass. This pivoting can result in decreased operational life of the wiper arm. In addition, the known bridge with vanes lacks openings disposed on the top of the bridge. These openings are needed to maintain the pressure balance on the two sides of the bendable lip of the blade so as to achieve an effective cleaning operation.

The present inventor has owned U.S. Pat. No. 5,311,636 disclosing a windshield wiper frame for use in a windshield wiper assembly for motor vehicles which includes a pair of primary yokes, and a bridge member pivotally connected to the pair of primary yokes and having at least one elongated vane which extends downwardly and at a slant from the front wall of the bridge member. This windshield wiper assembly can efficiently wipe the convex surface of the windshield glass and extend the operational life of the windshield wiper assembly. However, this windshield wiper frame may not be completely effective in the winter time or where there is heavy snow.

SUMMARY OF THE INVENTION

Accordingly, it is an object of the present invention to provide an improved winter windshield wiper having at least one contoured and flexible vane for a motor vehicle, which eliminates the above problems encountered with the conventional winter windshield wiper.

Another object of the present invention is to provide an improved winter windshield wiper including a connecting member, a rubber sheet sealed windshield wiper frame, and a horizontally elongated vane member having at least one flexible wing for effectively cleaning and wiping the convex surface of the windshield glass of a motor vehicle, and extending the operation life of the windshield wiper assembly.

A further object of the present invention is to provide an improved winter windshield wiper, which is simple in structure, inexpensive to manufacture, easy to use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an improved windshield wiper for a motor vehicle, which includes a wiper arm attached to a body of the motor vehicle, a connecting member connected to the wiper arm, a rubber sheet sealed windshield wiper frame disposed under the connecting member, and a horizontally elongated vane member attached between the connecting member and the rubber sheet sealed windshield wiper frame, the horizontally elongated vane member having at least one flexible wing, for cleaning and wiping the convex surface of the windshield of the motor vehicle, and extending the operation life of the windshield wiper.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 shows a conventional winter windshield wiper;

FIG. 2 is a perspective view of a first embodiment of the winter windshield wiper of the present invention;

FIG. 3 is an exploded perspective view of the first embodiment of the winter windshield wiper of the present invention;

FIG. 4 is a sectional view, taken along line 4—4 in FIG. 2; and

FIG. 5 is an exploded perspective view of a second embodiment of the winter windshield wiper of the present invention.

DESCRIPTION OF THE PREFERRED EMBODIMENTS

Referring now in detail to the drawings for the purpose of illustrating preferred embodiments of the present invention, the winter windshield wiper 10 for use in a motor vehicle as shown in FIGS. 2, 3 and 4, comprises a rubber sheet sealed windshield wiper frame 12 having a wiper blade 13, and a horizontally elongated vane member 11.

The rubber sheet sealed windshield wiper frame 12 includes a connecting member 14 having a wiper arm engaging aperture 31 for securely receiving a wiper arm attached to the body of the motor vehicle (not shown). The horizontally elongated vane member 11 is mounted between the connecting member 14 and the rubber sealed windshield wiper frame 12 (FIG. 2). The connecting member 14 is disposed on the rubber sealed windshield wiper frame 12. Accordingly, the winter windshield wiper 10 of the present invention cleans and wipes the convex surface of the windshield glass (not shown).

As shown in FIGS. 2 and 3, the horizontally elongated vane member 11 is contoured to have a downwardly concave configuration and is positioned at a slant with respect to the windshield wiper frame 12. While the motor vehicle is running and the winter windshield wiper 10 is operating, the elongated vane member 11 directs the flow of air so as to press down on the windshield wiper frame 12 and thereby improve the performance of the winter windshield wiper 10. An air stream directed by the vane member 11 scatters and hits the snow-covered surface and/or the convex surface of the windshield glass so that pressure is exerted on a flexible lip 19' of an entire wing 19 of the vane member 11, so as to apply a greater force to the winter windshield wiper 10 during operation so as to clean and wipe the convex surface of the windshield glass, even though snow is disposed on the surface of the windshield glass.

The horizontally elongated vane member 11 further includes a pair of extended portions 20 and a u-shaped space 22 disposed between the pair of extended portions 20 for imparting further flexibility thereto when the vane member is attached between the connecting member 14 and the rubber sheet sealed windshield wiper frame 12 (FIG. 2). The pair of extended portions 20 each have at least one rivet engaging aperture 21, respectively. The horizontally elongated vane member 11 is made of aluminum or the like.

As shown in FIG. 3, the connecting member 14 which is the same as the conventional connecting member 4 (FIG. 1) includes a pair of rivet engaging apertures 21' for receiving a corresponding rivet 18 and the wiper arm engaging aperture 31. The rivet 18 passes through the rivet engaging apertures 21 of the extended portions 20 of the vane member 11 and a primary yoke 15. A rubber sheet seals the primary yoke 15 and second and third yokes (not shown), and a flexible mounting stay 16 for mounting the wiper blade 13.

Referring in detail to FIG. 5, there is illustrated an additional embodiment of a winter windshield wiper construction in accordance with the present invention. The winter windshield wiper 110 includes a horizontally elongated vane member 111 which contains a pair of wings 119 each having a flexible lip 119', respectively, and a pair of neck-shaped portions 23 for imparting further flexibility to the vane member 111 and joining each of the pair of wings 119, respectively, to a central support portion 201. The connecting member 14 is modified to include a depending protrusion 112 on a side of the connecting member having the elongated vane 111. The central support portion 201 includes a recessed surface 22 between opposing planar sides thereof, the recessed surface being complementary in shape to the protrusion 112. The rivet apertures 21 are formed through the opposing planar sides. A depending face member 113 is formed across an entire exposed side of the central support portion 201 of the flexible vane member for abutment against a side wall of the windshield wiper frame 12 when the central support portion is inserted for connection between the protrusion 112 of the connecting member 14 and the windshield wiper frame 12. An additional mounting bracket 114 is formed at the outer end of each vane 119' for slidingly fitting over corresponding portions of the windshield wiper frame 12. The brackets 114 maintain the vanes 119' in position with respect to the windshield wiper frame 12 during operation. The other elements of the winter windshield wiper 111 are the same as the elements 12, 13, 15, 16, 17, 18, 20, 21 and 22 of the winter windshield wiper 10 shown in the first embodiment.

Accordingly, the winter windshield wiper 10 and 110 according to the present invention include the horizontally elongated vane members 11 and 111 which are attached between the connecting member 14 and the rubber sheet sealed windshield wiper frame 12, so that the flexible vane members 11 and 111 direct the air stream to scatter and hit the snow covered surface and/or the convex surface of the windshield glass of the motor vehicle, and further apply a more direct force to the winter windshield wiper 10 and 110 during operation so as to effectively clean and wipe the convex surface of the windshield glass even though snow is on the surface of the windshield glass of the motor vehicle. Also, the horizontally elongated vane members 11 and 111 can be attached to the conventional winter windshield wiper.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A winter windshield wiper assembly for a motor vehicle, said assembly comprises:

a connecting member having an aperture therein for securely receiving a wiper arm;

an elongated frame assembly which includes at least a primary yoke, said assembly is enclosed by a rubber sheet, said connecting member is coupled by at least one connector to said primary yoke with said sheet disposed therebetween;

an elongated wiper blade supported by said frame assembly;

an elongated wind receiving vane member for imparting a biasing force to said blade by air flow thereover, said vane member coupled to said at least one connector by at least one extended portion, said at least one extended portion lying between and in abutting engagement with both the rubber sheet and the connecting member.

2. The winter windshield wiper of claim 1, wherein said elongated vane member includes an entire wing having a flexible lip, and said at least one extended portion includes a pair of extended portions for attaching between said connecting member and said rubber sheet sealed windshield wiper frame so as to increase flexibility thereof.

3. The winter windshield wiper of claim 2, wherein said elongated vane member includes a pair of wings having a flexible lip, respectively, and said at least one extended portion includes a pair of extended portions attached between said connecting member and said elongated frame assembly so as increase flexibility thereof.

4. The winter windshield wiper of claim 3, wherein said elongated wind receiving vane member has a pair of neck-shaped portions disposed thereon and adjacent to said pair of wings, respectively.

5. The winter windshield wiper of claim 2, wherein said elongated wind receiving vane member has a concave configuration and is positioned at a slant with respect to said elognated frame assembly.

6. The winter windshield wiper of claim 2, wherein said elongated wind receiving vane member is made of aluminum.

7. The winter windshield wiper of claim 2, wherein said at least one connector comprises a pair of rivets connected to the elongated frame assembly frame for slidably receiving bolt engaging apertures of the pair of extended portions of said elongated wind receiving vane member.

8. The winter windshield wiper of claim 1, wherein said at least one extended portion includes a central support portion, said elongated vane member includes a pair of wings extending from said central support portion, said central support portion including a depending face plate for abutment against a corresponding face of said wiper arm.

9. The winter windshield wiper of claim 8, wherein each of said pair of wings includes a bracket formed adjacent to a distal and thereof for securing said pair of wings to said elongated frame assembly.

10. The winter windshield wiper of claim 8, wherein the central support portion includes a recessed surface for making engagement with the depending face plate of said connecting member, thereby accurately positioning said elongated wind receiving vane member with respect to said elongated frame assembly.

* * * * *